US008601146B2

(12) United States Patent
Pascual Avila et al.

(10) Patent No.: US 8,601,146 B2
(45) Date of Patent: Dec. 3, 2013

(54) METHODS, SYSTEMS, AND COMPUTER READABLE MEDIA FOR SESSION INITIATION PROTOCOL (SIP) IDENTITY VERIFICATION

(75) Inventors: Victor Pascual Avila, Barcelona (ES); Jiri Kuthan, Berlin (DE); Dorgham Sisalem, Berlin (DE); Raphael Coeffic, Potsdam (DE)

(73) Assignee: Tekelec, Inc., Morrisville, NC (US)

( * ) Notice: Subject to any disclaimer, the term of this patent is extended or adjusted under 35 U.S.C. 154(b) by 306 days.

(21) Appl. No.: 12/909,128

(22) Filed: Oct. 21, 2010

(65) Prior Publication Data

US 2011/0099282 A1    Apr. 28, 2011

Related U.S. Application Data

(60) Provisional application No. 61/253,669, filed on Oct. 21, 2009.

(51) Int. Cl.
*G06F 15/16* (2006.01)

(52) U.S. Cl.
USPC .................. 709/229; 455/404.1; 455/411

(58) Field of Classification Search
USPC ...................................................... 709/229
See application file for complete search history.

(56) References Cited

U.S. PATENT DOCUMENTS

| 6,195,555 | B1 | 2/2001 | Dent |
| 6,411,632 | B2 | 6/2002 | Lindgren et al. |
| 6,418,319 | B1 | 7/2002 | Dent |
| 6,542,716 | B1 | 4/2003 | Dent et al. |
| 6,545,987 | B1 | 4/2003 | Becher |
| 6,546,242 | B1 | 4/2003 | Alperovich et al. |
| 6,600,734 | B1 | 7/2003 | Gernert et al. |
| 6,611,684 | B1 | 8/2003 | Franks |
| 6,611,692 | B2 | 8/2003 | Raffel et al. |
| 6,708,031 | B2 | 3/2004 | Purnadi et al. |
| 7,738,488 | B2 | 6/2010 | Marsico et al. |

(Continued)

FOREIGN PATENT DOCUMENTS

| EP | 1 199 842 | 4/2002 |
| WO | WO 03/063404 | 7/2003 |

OTHER PUBLICATIONS

Network Working Group RFC: 4235 Cisco systems H. Schulzrinne, Columbia University R. Mahy, Ed. SIP Edge LLC, Nov. 2005.*

(Continued)

*Primary Examiner* — Tauqir Hussain
(74) *Attorney, Agent, or Firm* — Jenkins, Wilson, Taylor & Hunt, P.A.

(57) ABSTRACT

Methods, systems, and computer readable media for verifying the identity of a SIP user seeking to establish a session are disclosed. Methods for verifying the identity of a SIP user seeking to establish a session described herein may be performed at a computing platform that includes a SIP user agent. According to one method, an INVITE message for establishing a session is received, where the INVITE message includes sender identification information and dialog identification information. In response to receiving the INVITE message, a subscription request including the dialog identification information is sent to a second computing platform that includes a user agent identified by the sender identification information in the INVITE message. A response to the subscription request is received and, based on the response to the subscription request, it is determined whether the identity of the sender of the INVITE message can be verified.

11 Claims, 13 Drawing Sheets

(56) References Cited

U.S. PATENT DOCUMENTS

| | | |
|---|---|---|
| 2003/0051041 A1 | 3/2003 | Kalavade et al. |
| 2003/0139180 A1 | 7/2003 | McIntosh et al. |
| 2003/0169713 A1 | 9/2003 | Luo |
| 2004/0002335 A1 | 1/2004 | Pan et al. |
| 2005/0083971 A1 | 4/2005 | Delaney et al. |
| 2005/0122941 A1 | 6/2005 | Wu et al. |
| 2005/0186960 A1 | 8/2005 | Jiang et al. |
| 2006/0025126 A1 | 2/2006 | Lu et al. |
| 2006/0052113 A1 | 3/2006 | Ophir et al. |
| 2006/0079228 A1* | 4/2006 | Marsico et al. ............... 455/433 |
| 2006/0168015 A1* | 7/2006 | Fowler .......................... 709/206 |
| 2007/0036136 A1* | 2/2007 | Barclay et al. ................ 370/352 |
| 2007/0100981 A1* | 5/2007 | Adamczyk et al. ............ 709/223 |
| 2007/0201660 A1* | 8/2007 | Lan et al. .................. 379/201.01 |
| 2007/0214217 A1* | 9/2007 | Ueno et al. .................... 709/204 |
| 2008/0052400 A1* | 2/2008 | Ekberg .......................... 709/227 |
| 2008/0092226 A1* | 4/2008 | Horvath et al. ................. 726/12 |
| 2008/0310312 A1* | 12/2008 | Acharya et al. ............... 370/241 |
| 2011/0103265 A1* | 5/2011 | Dilipkumar Saklikar et al. ............................. 370/259 |

OTHER PUBLICATIONS

Kuthan et al., "Dialog Event for Identity Verification," SIP WG Internet Draft (Oct. 25, 2008).

Elwell, "End-to-End Identity Important in the Session Initiation Protocol (SIP)," SIP WG Internet Draft (Jul. 7, 2008).

Rosenberg et al., "An INVITE-Initiated Dialog Event Package for the Session Initiation Protocol (SIP)," Network Working Group, RFC 4235 (Nov. 2005).

Sparks et al., "Session Initiation Protocol Call Control—Transfer," SIPPING WG Internet Draft (Jul. 17, 2005).

Sparks, "The Session Initiation Protocol (SIP) Referred-By Mechanism," Network Working Group, RFC 3892 (Sep. 2004).

Mahy et al., "The Session Initiation Protocol (SIP) 'Replaces' Header," Network Working Group, RFC 3891 (Sep. 2004).

Rosenberg, "A Watcher Information Event Template-Package for the Session Initiation Protocol (SIP) 'Replaces Header,'" Network Working Group, RFC 3857 (Aug. 2004).

Rosenberg, "A Presence Event Package for the Session Initiation Protocol (SIP)," Network Working Group, RFC 3856 (Aug. 2004).

Mahy, "A Message Summary and Message Waiting Indication Event Package for the Session Initiation Protocol (SIP)," Network Working Group, RFC 3842 (Aug. 2004).

Rosenberg et al., "Indicating User Agent Capabilities in the Session Inflation Protocol (SIP)," Network Working Group, RFC 3840 (Aug. 2004).

Rosenberg et al., "Best Current Practices for Third Party Call Control (3pcc) in the Session Initiation Protocol (SIP)," Network Working Group, RFC 3725 (Apr. 2004).

Mealling, "The IETF XML Registry," Network Working Group, RFC 3688 (Jan. 2004).

Sparks, "The Session Initiation Protocol (SIP) Refer Method," Network Working Group, RFC 3515 (Apr. 2003).

Rosenberg, "The Session Initiation Protocol (SIP) Update Method," Network Working Group, RFC 3311 (Sep. 2002).

Roach, "Session Initiation Protocol (SIP)—Specific Event Notification," Network Working Group, RFC 3265 (Jun. 2002).

Rosenberg et al., "SIP: Session Initiation Protocol," Network Working Group, RFC 3261 (Jun. 2002).

Murata et al., "XML Media Types," Network Working Group, RFC 3023 (Jan. 2001).

Paoli et al., "Extensible Markup Language (XML) 1.0 (Second Edition)," W3C FirstEdition REC-xml-20001006 (Oct. 2000).

Moats, "A URN Namespace for IETF Documents," Network Working Group, RFC 2648 (Aug. 1999).

Handly et al., "SIP: Session Initiation Protocol," Network Working Group, RFC 2543 (Mar. 1999).

Holtman et al., "Media Feature Tag Registration Procedure," Network Working Group, RFC 2506 (Mar. 1999).

Dierks et al., "The TLS Protocol Version 1.0," Network Working Group, RFC 2246 (Jan. 1999).

Moats, "URN Syntax," Network Working Group, RFC 2141 (May 1997).

Bradner, "Key Words for Use in RFCs to Indicate Requirement Levels," Network Working Group, RFC 2119 (Mar. 1997).

Notice of Allowance and Fee(s) Due for U.S. Appl. No. 11/227,427 (Jan. 25, 2010).

Non-Final Official Action for U.S. Appl. No. 11/227,427 (Jun. 24, 2009).

Non-Final Official Action for U.S. Appl. No. 11/227,427 (Dec. 12, 2008).

Notification of Transmittal of the International Search Report and the Written Opinion of the International Searching Authority, or the Declaration for International Application No. PCT/US05/32834 (Jul. 11, 2008).

Non-Final Official Action for U.S. Appl. No. 11/227,427 (Jun. 17, 2008).

"CORBA® Basics," Object Management Group, http://www.omg.org/gettingstarted/corbafaq.htm, pp. 1-5 (May 26, 2005).

"Voice-over-IP Network Appliance," WiFi® Phone, pp. 1-5 (Publication Date Unknown) (Downloaded from the Internet Aug. 30, 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," PACKET, Cisco Systems Users Magazine, vol. 16, No. 1, pp. Cover; 73-74; and 89 (First Quarter 2004).

UMA Technology: Overview, http://unmatechnology.org/overview/index.htm, pp. 1-2 (2004).

"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Kewney, "News—Palm Goes for Voice Over WiFi and Internet—Using Cisco Tech," pp. 1-3 (May 30, 2003).

"Stu's Weblog," pp. 1-2 (May 17, 2003).

Moodie, "Agilent acceSS7: White Paper," Agilent Technologies, pp. 1-14 (Apr. 1, 2003).

Tehrani, "The Rise of Enterprise WiFi Telephony," Internet Telephony Publisher's Outlook, pp. 1-5 (Mar. 2003).

"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).

"Cisco ITP MAP Gateway for Public WLAN SIM Authentication and Authorization," Cisco Systems, Inc., pp. 1-13 (Copyright 1992-2003).

"First Public WLAN to GSM Network Aggregation Service Launched as WeRoam® Goes Commercial with Transat Software," Transat Technologies, pp. 1-2 (Nov. 23, 2002).

Werbach, "Sifry's Alerts: Kevin Werbach on Wifi PBXs," pp. 1-2 (Oct. 10, 2002).

Werbach, "Open Spectrum: The New Wireless Paradigm," New America Foundation, pp. 1-20 (Oct. 2002).

Orzech, "WLAN Software Turns PDAs Into Cell Phones," pp. 1-2 (Sep. 18, 2002).

Griffith, "The Marriage of WLAN to GSM," pp. 1-2 (Aug. 22, 2002).

Blackwell, "Inter-network Roaming," pp. 1-4 (Jun. 28, 2002).

Sutherland, "Mobile Carriers Weave Wi-Fi," pp. 1-3 (May 17, 2002).

"Sifry's Alerts: Transat Technologies Raises $6 Million Series A," p. 1 (May 7, 2002).

(56) References Cited

OTHER PUBLICATIONS

Blackwell, "Wireless Anywhere—Even Miles from an Access Point?" pp. 1-3 (Apr. 22, 2002).
Liu, "Deutsche Telekom to Integrate Cell/WLAN Service," pp. 1-2 (Mar. 8, 2002).
Barry, "A Signal for Savings," PACKET, Cisco Systems Users Magazine, vol. 14, No. 4, pp. Cover; 19-21; and 81 (Fourth Quarter 2002).
"Agilent Technologies and Cisco Systems SS7 over IP White Paper," Cisco Systems, Inc. and Agilent Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
allNetDevices Staff, "Antenna Combines WLAN, Cellular, GPS," p. 1 (Dec. 5, 2001).
Haskin, "Global Roaming Breakthrough Claimed," http://www.internetnews.com/ wireless/print.php/900871, pp. 1-2 (Oct. 10, 2001).
Peretz, "COPS to Enable Global Roaming Across Cellular and WLANs," p. 1 (Oct. 9, 2001).
"Agilent acceSS7 Business Intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Heine, "GSM Networks: Protocols, Terminology, and Implementation, Scenarios," Mobile Communications Series, pp. 233-250 (1999).
"Topsail Beach—SS7 Over IP—"Cisco Systems, Inc., pp. 1-16 (Copyright 1999).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.2(4)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
"GSM Signaling Platform: WLAN and GSM Interconnection Application," Performance Technologies, pp. 1-2 (Publication Data Unknown).
"Seamless WLAN/GSM Roaming on All Enabled Hotspots Worldwide," WERoam, pp. 1-4 (Publication Data Unknown).
"Wireless LAN the Easy Way: Transat Introduces the Affordable Solution for WLAN-enabled 3G Services," pp. 1-2 (Publication Date Unknown).

\* cited by examiner

METHODS, SYSTEMS, AND COMPUTER READABLE MEDIA FOR SESSION INITIATION PROTOCOL (SIP) IDENTITY VERIFICATION

PRIORITY CLAIM

This application claims the benefit of U.S. Provisional Patent Application Ser. No. 61/253,669 filed Oct. 21, 2009; the disclosure of which is incorporated herein by reference in its entirety.

TECHNICAL FIELD

The subject matter described herein relates to verifying the identity of users in communications networks. More specifically, the subject matter relates to methods, systems, and computer readable media for providing SIP user identity verification.

BACKGROUND

In SIP networks, the sender identification information included in an INVITE message used for establishing a session may include the information in the "From" header field. This information typically includes the display name of the sender and the sender's address of record (AOR). The address of record is frequently thought of as the public address of the user. The display name of the user is the name that may be displayed by a SIP terminal. In SIP networks, the address of record is the public address at which other nodes can contact the entity. in one exemplary definition, an address of record is a SIP or SIPS uniform resource identifier (URI) that points to a domain with a location service that can map the uniform resource identifier (URI) to another URI where the user might be available. According to Internet engineering task force (IETF) request for comments (RFC) 3261, the disclosure of which is incorporated by reference herein in its entirety, the "To" header field contains the address of record whose registration is to be created, queried, or modified. Typically, the location service is populated through registrations.

One problem associated with conventional SIP registration operation described in RFC 3261 is registration hijacking, where either or both of these values can be forged by an attacker. SIP registration allows a user agent to identify itself to a registrar as a device at which the user (designated by an address of record) is located. A registrar may assess the identity asserted in the "From" header field of a SIP REGISTER message in order to determine whether this request can modify the contact addresses associated with the address-of-record in the "To" header field. While these two fields are frequently the same, there are many valid deployments in which a third-party may register contacts on a user's behalf. For example, in contrast to the "To" header field, the "From" header field of a SIP request can be modified arbitrarily by the owner of a user agent (UA). This opens the door to malicious registrations. An attacker that successfully impersonates a party authorized to change contacts associated with an address-of-record could, for example, de-register all existing contacts for a URI and then register their own device as the appropriate contact address, thereby directing all requests for the affected user to the attacker's device. This threat demonstrates the need for services that allow SIP entities to authenticate the senders of requests.

Accordingly, in light of these difficulties, a need exists for improved methods, systems, and computer readable media for verifying that the entity identified by the address of record and/or the display name is really the entity that is attempting to initiate a session.

SUMMARY

Methods, systems, and computer readable media for verifying the identity of a SIP user seeking to establish a session are disclosed. Methods for verifying the identity of a SIP user seeking to establish a session described herein may be performed at a computing platform that includes a SIP user agent. According to one method, an INVITE message for establishing a session is received, where the INVITE message includes sender identification information and dialog identification information. In response to receiving the INVITE message, a subscription request including the dialog identification information is sent to a second computing platform including user agent identified by the sender identification information in the INVITE message. A response to the subscription request is received and, based on the response to the subscription request, it is determined whether the identity of the sender of the INVITE message can be verified.

A system for SIP identity verification is also disclosed. The system includes a computing platform. The system further includes a session initiation module implemented on the computing platform for receiving an INVITE message for establishing a session, where the INVITE message includes sender identification information and dialog identification information. The system further includes a dialog event package module implemented on the computing platform for supporting a SIP dialog event package. The system further includes an identity verification module implemented on the computing platform for instructing the dialog event package module to send a subscription request including the dialog identification information to a second computing platform including a user agent identified by the sender identification information in response to receiving the INVITE message. The identity verification module is also configured to receive a response to the subscription request and determine, based on the response, whether the identity of the sender of the INVITE message can be verified.

The subject matter described herein for verifying the identity of a SIP user seeking to establish a session may be implemented using a tangible, non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

The subject matter described herein may be implemented at a node, such as a SIP user agent node. The term "node" as used herein refers to a computing platform with one or more processors and associated memory.

BRIEF DESCRIPTION OF THE DRAWINGS

The subject matter described herein will now be explained with reference to the accompanying drawings of which.

DETAILED DESCRIPTION

The subject matter described herein includes methods and systems for providing SIP identity verification. Verifying that an entity identified by an address of record and/or a display name included in a SIP INVITE message is actually the entity that is attempting to initiate a session may be accomplished by initiating a dialog between the SIP UAS and the SIP UAC identified by the INVITE message that purportedly initiated the session. For example, an identity verification module located at a UAS may be configured to send a SIP SUBSCRIBE message to the UAC in response to receiving an INVITE message from the UAC, where the SUBSCRIBE message includes dialog identification information extracted from the INVITE message. If the UAC returns a response to the UAS's SUBSCRIBE message that indicates that the UAC is unaware of the dialog, the UAS may determine that the identity of the sender of the INVITE message cannot be verified. If the sender's identity cannot be verified, the UAS may determine an action to be taken that may include not establishing a dialog with the "attacker" SIP UAC and/or notifying the session originator of the suspicious activity. By providing a mechanism for verifying the identity of SIP users, registration hijacking and other security risks/attacks may be prevented and/or mitigated. Details of various exemplary methods and systems for providing SIP identity verification are described in greater detail below.

Figure 1:
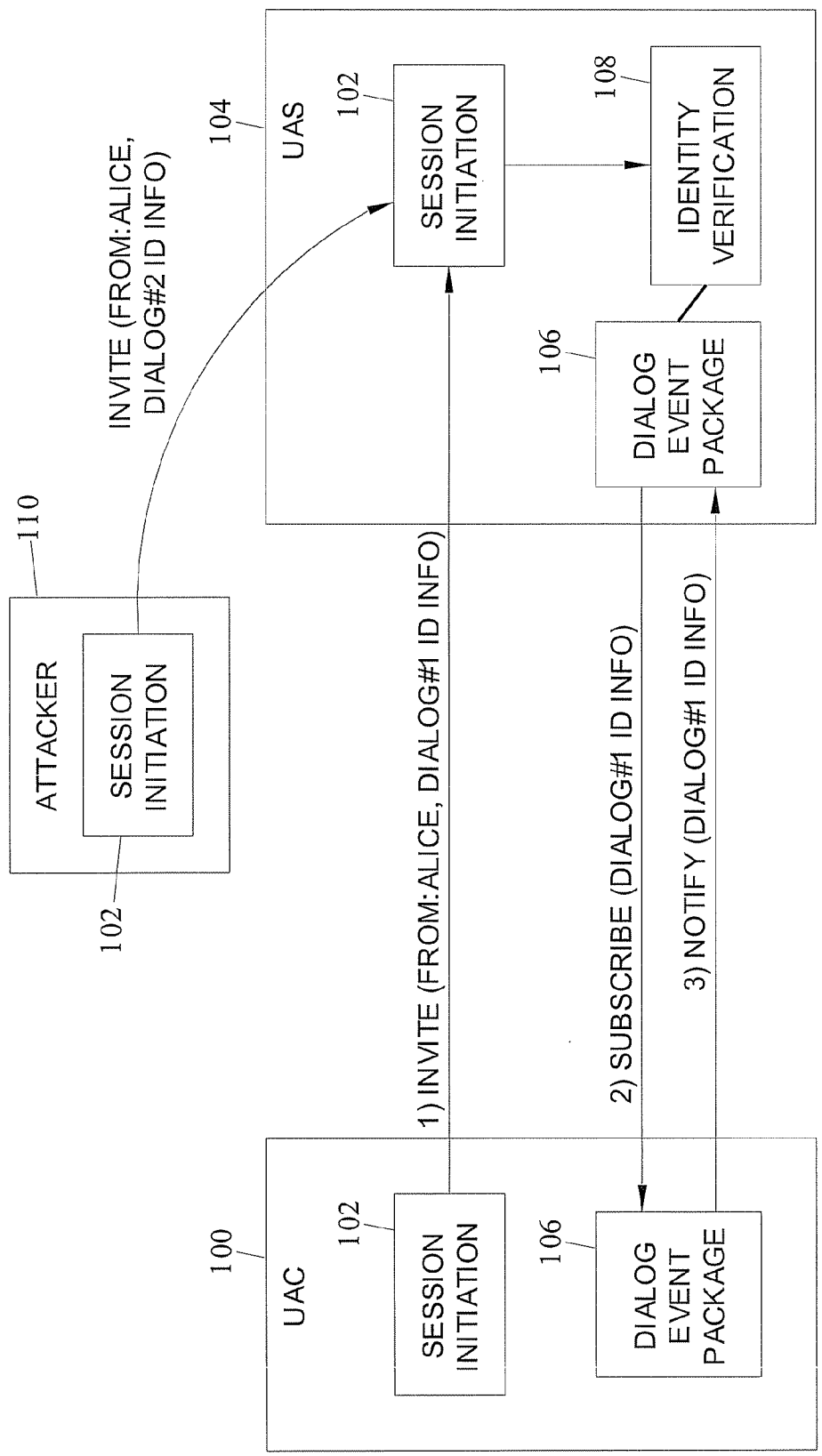
FIG. 1 is block diagram illustrating an exemplary user agent client and a user agent server for verifying the identity of a SIP user seeking to establish a session according to an embodiment of the subject matter described herein.

FIG. 1 is a block diagram illustrating an exemplary user agent client and a user agent server for verifying the identity of a SIP user seeking to establish a session according to an embodiment of the subject matter described herein. Referring to FIG. 1, a user agent client 100 includes a session initiation module 102 that initiates a session with a user agent server 104. User agent client 100 and user agent server 104 may each be implemented at least partially in hardware. For example, user agent client 100 and user agent server 104 may be computing platforms with one or more processors and one or more computer readable media. The processors on each of user agent client 100 and user agent server 104 may execute instructions stored in the respective computer readable media to implement the steps described herein for identity verification. Such computing platforms may be operator network nodes, such as operator controlled servers or user nodes, such as mobile handsets.

In the illustrated example, user agent client 100 includes a session initiation module 102 that initiates a session with a corresponding session initiation module 102 of user agent server 104. User agent client 100 and user agent server 104 each include a dialog event package module 106 for supporting INVITE initiated dialog event packages as specified in IETF RFC 4235, the disclosure of which is incorporated by reference herein in its entirety. User agent server 104 may also include an identity verification module 108 that, in response to receiving an INVITE message, instructs dialog event package module 106 to send a SUBSCRIBE message to the corresponding dialog event package module 106 of user agent client 100 using sender identification information and dialog identification information from the received INVITE message. The sender identification information in the INVITE message may include the information in the "From" header field. This information typically includes the display name of the sender and the sender's address of record. In SIP networks, the address of record is the public address at which other nodes can contact the entity. As described above, an address of record is a SIP or SIPS URI that points to a domain with a location service that can map the URI to another URI where the user might be available.

Dialog event package module 106 of user agent client 100 may respond to SUBSCRIBE messages with NOTIFY or other messages indicating its awareness or non-awareness of the identified dialogs. Identity verification module 108 may determine, based on the response message whether the sender of an INVITE message can be verified.

A dialog is identified at each UA with a unique dialog-ID, which consists of a Call-ID value, a local tag and a remote tag. When a UA sends a request outside of a dialog, it provides only "half" of the dialog ID. The dialog is completed from the responses contributing the second "half" of the dialog ID. The INVITE-Initiated Dialog Event Package for SIP (RFC 4235) defines an event package for INVITE-initiated dialog usages. It allows users to subscribe to another user and to receive notification of the changes in state of INVITE-initiated dialog usages in which the subscribed-to user is involved. The subject matter described herein provides a simple mechanism to prevent an attacker from presenting a forged "From" header field. It offers an end-to-end identity assumption which does not require any previous association or trust relationship between administrative domains or the UAs. The UAS verifies the "From" header by subscribing to the Dialog Event package (RFC 4235) at the AOR in the "From" header field. If the entity calling is registered under this AOR, it will confirm that it is calling by sending some valid dialog state. In this case, the identity of the caller is considered to be verified.

Multiple examples of call flows between user agent client 100 and user agent server 104 are detailed in an IETF Internet Draft entitled, "Dialog Event for Identity Verification, draft-kuthan-sip-derive-00," the disclosure of which is incorporated herein by reference in its entirety.

In the example scenario shown in FIG. 1, if an attacker 110 attempts to establish a session with user agent server 104 by forging the identity of user agent client 100 in the INVITE message, identity verification module 108 may send a SUBSCRIBE message to user agent client 100 which includes dialog identification information extracted from the INVITE message. If user agent client 100 sends a response to user agent server 104 indicating that user agent client 100 is unaware of the dialog, user agent server 104 may determine that the identity of the sender of the INVITE message cannot be verified. If the sender's identity cannot be verified, user agent server 104 may choose to whether or not to establish a session with attacker 110.

Figure 2:
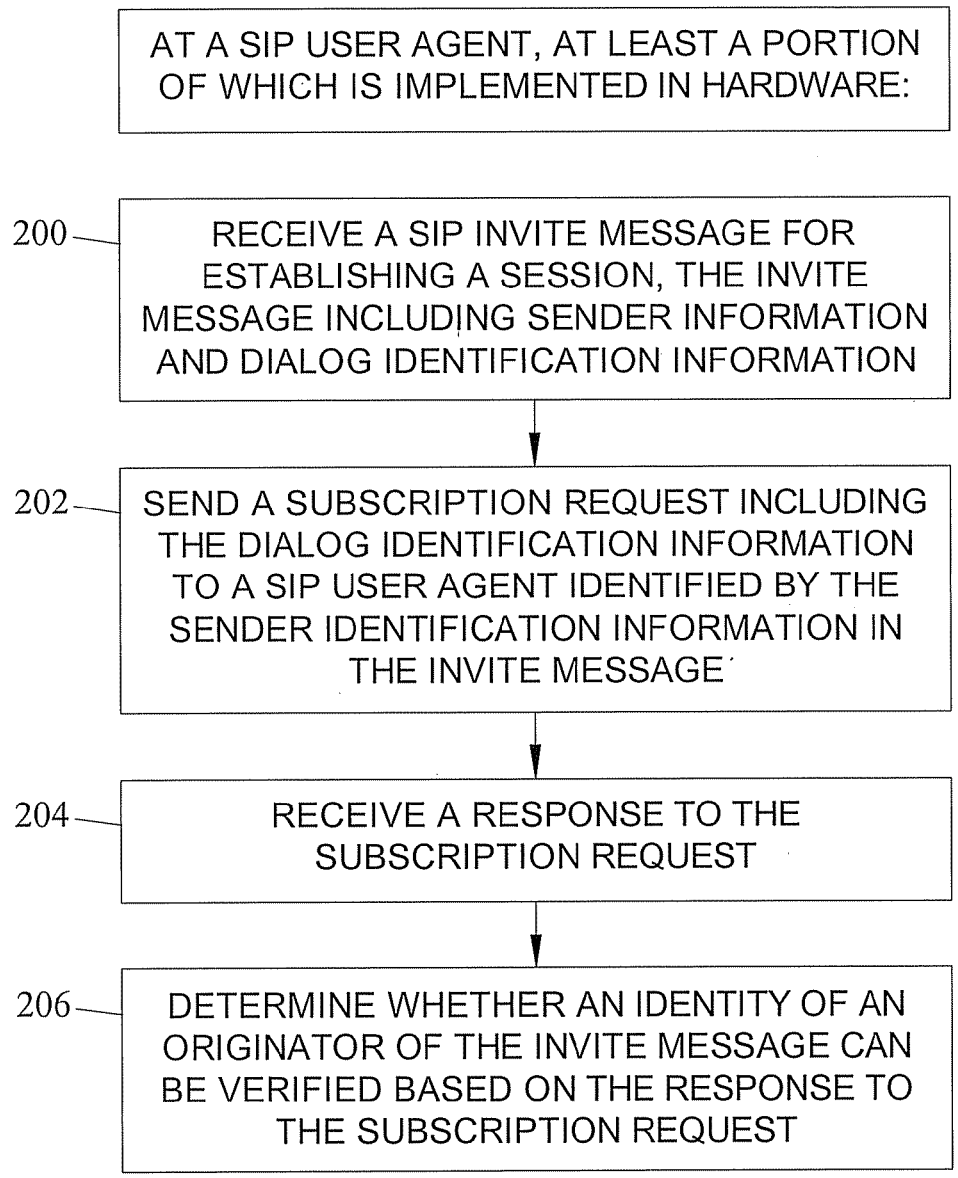
FIG. 2 is flow chart illustrating an exemplary process for verifying the identity of a SIP user seeking to establish a session according to an embodiment of the subject matter described herein.

FIG. 2 is a flow chart illustrating an exemplary process for verifying the identity of a SIP user seeking to establish a session according to an embodiment of the subject matter described herein. The steps shown in FIG. 2 may be performed at a SIP user agent at least a portion of which is implemented in hardware. For example, the steps illustrated in FIG. 2 can be implemented at a SIP user agent server node. Referring to FIG. 2, at step 200, an INVITE message for establishing a session is received, where the INVITE message includes sender identification information and dialog identification information. For example, session initiation module 102 located at UAS 104 may receive INVITE message from session initiation module 102 located at UAC 100 that includes "From" field indicating that Alice is the session/message sender and is associated with Dialog 1.

At step 202, in response to receiving the INVITE message, a subscription request that includes the dialog identification information from the INVITE message is sent to a user agent identified by the sender identification information in the INVITE message. For example, session initiation module 102 located at UAS 104 may communicate with identify verification module 108 and dialog event package manager 106 in order to generate and send a SIP SUBSCRIBE message associated with Dialog 1 to a corresponding dialog event package manager 106 located at UAC 100. The SUBSCRIBE message may specify an event identifying a half-dialog that is being subscribed to. For example, determining whether the identity of the sender of the INVITE message can be verified may include determining that the identity can be verified in response to receiving a response message indicating awareness of the half-dialog.

At step 204, a response to the subscription request is received. For example, dialog event package manager 106 located at UAC 100 may return a SIP NOTIFY message associated with Dialog 1 to corresponding dialog event package manager 106 located at UAS 104. The NOTIFY message may indicate awareness or non-awareness of the half-dialog.

At step 206, based on the response to the subscription request, it is determined whether the identity of the sender of the INVITE message can be verified. For example, based on the NOTIFY message associated with Dialog 1 that was received from UAC 100, identity verification module 108 may determine that the INVITE message from UAC 100 associated with Dialog 1 is valid (i.e., verified) while the INVITE message received from "attacker" UAC 100 associated with Dialog 2 is not valid (i.e., not verified). This may be because UAC 100 recognizes Dialog 1 but does not recognize Dialog 2, with which UAC 100 is not associated.

In response to determining that the identity of the sender of the INVITE message cannot be verified, establishment of the session may be rejected. Rejecting the establishment of the session may include sending a suspicious call indication to the sender of the INVITE message. For example, a 434 (Suspicious Call) response code may be generated by a UAS to indicate that the server refused to fulfill the request because the requestor could not be verified. A UAC may, for example, register the AOR sent in the "From" header field with a default reason phrase of "Suspicious Call".

In another embodiment, in response to determining that the identity of the sender of the INVITE message cannot be verified, the session may be established with the sender of the INVITE message. For example, even though Dialog 2, which is purportedly from "Alice", was received from "attacker" UAC 110, UAS 104 may still establish a session with UAC 110. One purpose of doing so may include obtaining more information from UAC 100 in order to alert authorities of the attacker or in order to attempt additional identity verification measures outside of the scope of the subject matter described herein. Also, in the case that UAS 104 is not concerned with security (e.g., a SIP identity verification feature is disabled), UAS 104 may continue to establish a session with attacker UAC 110 without restriction or may isolate/segregate the memory associated with the session and/or generate more detailed logging for the session.

Figure 3:
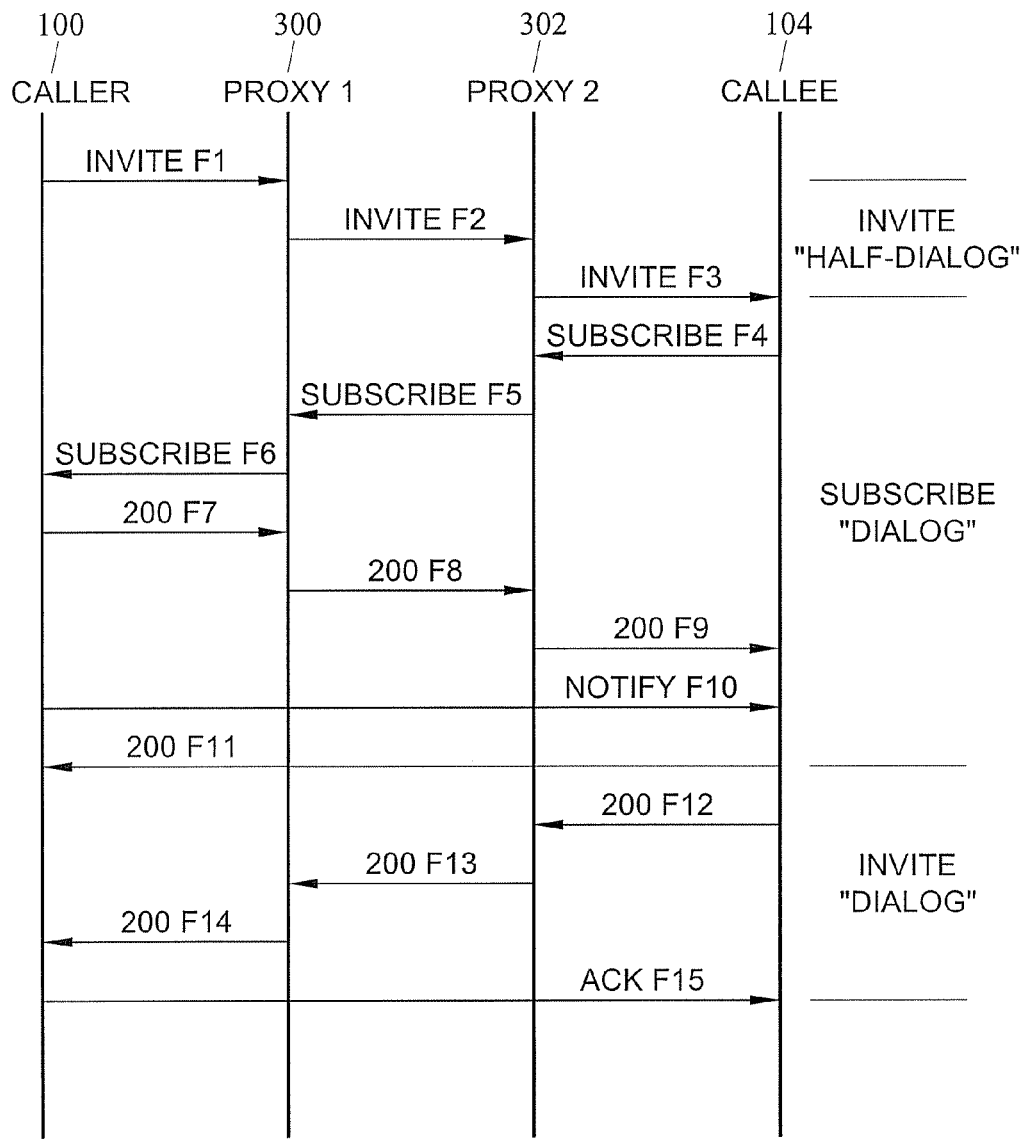
FIG. 3 is a message sequence diagram showing an exemplary overview of operation for verifying the identity of a SIP user seeking to establish a session according to an embodiment of the subject matter described herein.

FIG. 3 is a message sequence diagram showing an exemplary overview of operation for verifying the identity of a SIP user seeking to establish a session according to an embodiment of the subject matter described herein. Referring to FIG. 3, when Caller (UAC) 100 desires to initiate a session with Callee (UAS) 104, Caller (UAC) 100 may form an INVITE-request (F1-F3) indicating its identity (AOR) in the "From:" header field. This request may be forwarded traversing some servers, Proxy 1 300 and Proxy 2 302. When UAS 104 receives the INVITE request, UAS 104 needs to decide whether to authorize or reject the call based on the identity of the sender (conveyed in the "From:" header field). Hence, prior to accepting the call, Callee 104 desires to verify the identity of the potential Caller 100. This is done by inspecting the "From:" header field and sending a subscription to the dialog event package (F4-F6) in the opposite direction to the INVITE request. The SUBSCRIBE request is sent before any 18x or final response to the identity specified in the INVITE's "From" header field. The "Expires" header field value is equal to 0 to signal a one-time subscription. The "Event" header field includes the part of dialog identifier known at this point. As an alternative, the dialog information may also be sent in a body defining a filter to be applied to the subscription.

The SUBSCRIBE request may then be forwarded to Proxy 2 302, from there to Proxy 1 300, and from there (because of retargeting of a dialog-forming request) to the Contact address binded to the AOR conveyed in the "From:" header field of the original INVITE request. If the subscription is accepted (F7-F9), the notifier sends immediately a NOTIFY-request (F10) to communicate the existence and current state of that "half-dialog" to the subscriber (Callee) 100. This NOTIFY message may be sent on the same dialog as created by the SUBSCRIBE response. The body of the notification may contain a dialog information document used to report the state of the "half-dialog" being monitored. This information should be formatted into one of the body formats specified in the "Accept" header of the corresponding SUBSCRIBE request and can contain either the state of the subscribed resource or a pointer to such state in the form of a URI. In case the notifier is not aware of the "half-dialog" being monitored, a 481 (Call/Transaction Does Not Exist) response to the SUB- SCRIBE request may be sent instead. The result of the Caller's identity verification may be provided as input to an authorization process (out of the scope of this document). Once this authorization process is completed, if Callee 104 decides to accept the call, the INVITE may be accepted and Callee's UAS 104 core may generate a 2xx (F12-F14) response which establishes a dialog. Otherwise, when Callee's UAS 104 is not willing to accept the call because Caller 100 was not aware of the monitored "half-dialog", a 434 (Suspicious Call) response may be returned (F12-F14).

Figure 4:
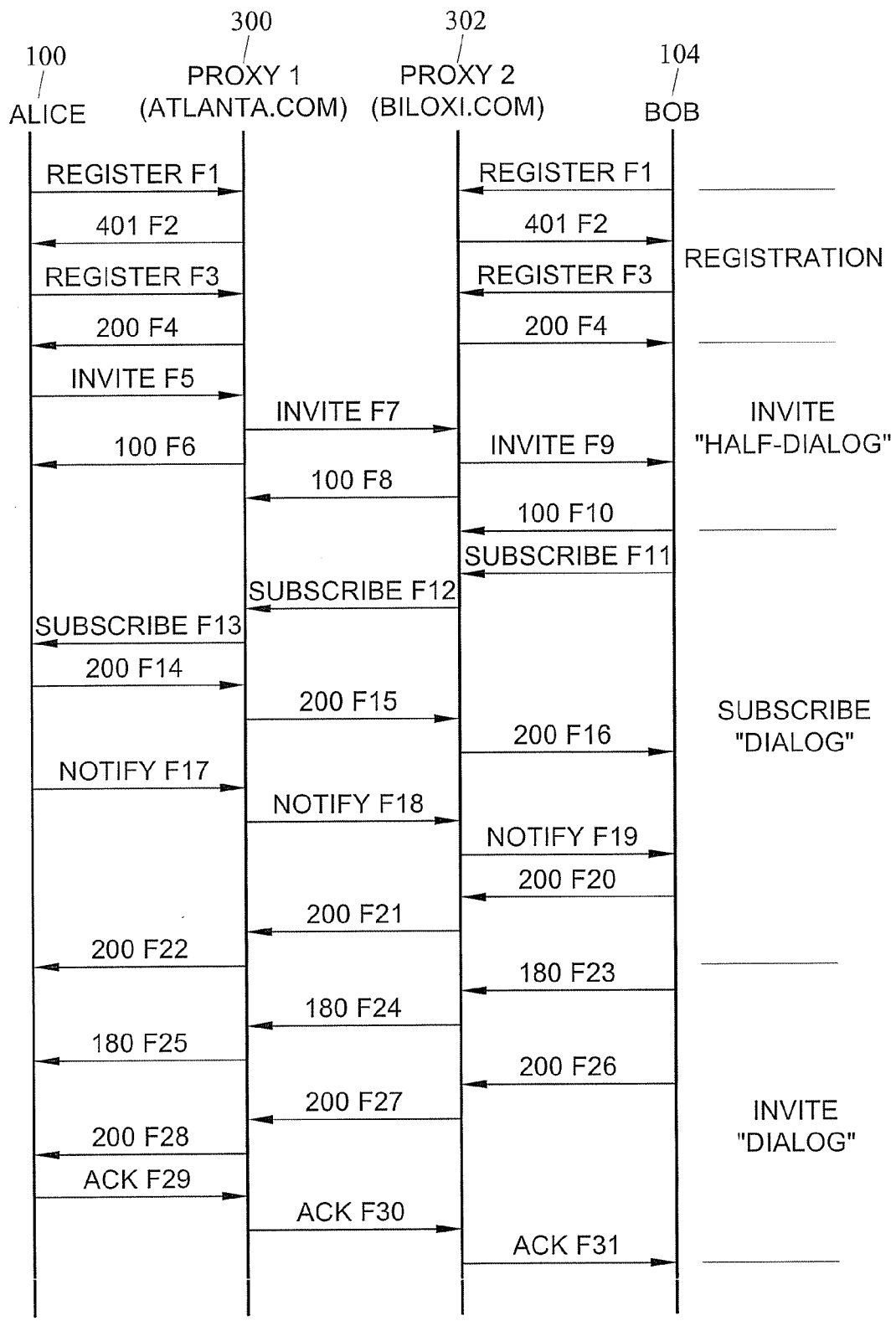
FIG. 4 is a message sequence diagram showing an exemplary verified call scenario for verifying the identity of a SIP user seeking to establish a session according to an embodiment of the subject matter described herein.

FIG. 4 is a message sequence diagram showing an exemplary verified call scenario for verifying the identity of a SIP user seeking to establish a session according to an embodiment of the subject matter described herein. FIG. 4 illustrates identity verification and session establishment between two SIP User Agents (UAs) which belong to two different service providers (e.g., atlanta.com and biloxi.com). Alice and Bob (UAs) register and authenticate with their respective domains (F1-F4) to be able to receive the requests via their home proxy. In some cases, caller registration may be triggered upon receipt of a 434 Response. Proxy 1 300 and Proxy 2 302 may belong to two different service providers which wish to be present in all message exchanges. Hence, Proxy 1 300 and Proxy 2 302 may record-route any dialog-establishing requests. In that case, UAs may elect to use S/MIME encryption of requests.

In the scenario shown in FIG. 4, Alice 100 completes a call to Bob 104 using two proxies (e.g., Proxy 1 and Proxy 2) from different service providers. In order to verify Alice's identity, Bob's UA 104 subscribes to the status of Alice's "half-dialog". Alice's UAC 100 sends an INVITE request to Bob's UAS 104 that may look, in part, like:

```
F5 INVITE Alice -> Proxy 1 (atlanta.com)
INVITE sip:bob@biloxi.com SIP/2.0
From: Alice <sip:alice@atlanta.com>;tag=9fxced76sl
To: Bob <sip:bob@biloxi.com>
Call-ID: 3848276298220188511@atlanta.com
Supported: dialog
Contact: <sip:alice@client.atlanta.com>
Content-Type: application/sdp
Content-Length: ...
```

After receiving Alice's INVITE request, Bob's UAS 104 may send a dialog forming SUBSCRIBE request with an "Expires" of 0 to the AOR conveyed in the "From:" header field of the original INVITE-request. For example:

```
F11 SUBSCRIBE Bob -> Proxy 2 (biloxi.com) "Fetch Operation"
SUBSCRIBE sip:alice@atlanta.com SIP/2.0
From: Bob <sip:Bob@biloxi.com>;tag=8672349
To: <sip:alice@atlanta.com>
Call-ID: xt4653gs2ham@biloxi.com
Contact: <sip:bob@client.biloxy.com>
Event: dialog;call-id=3848276298220188511@atlanta.com;to-tag=9fxced76sl
Expires=0
Accept: application/dialog-info+xml
Content-Length: 0
```

This SUBSCRIBE request may contain an "Event:" header field that may identify the "half-dialog" being subscribed to. The SUBSCRIBE may be forwarded to Proxy 2 300, from there to Proxy 1 302, and from there it may be re-targeted to Alice (F13) 100. Upon receipt of this SUBSCRIBE request, the notifier may send a single NOTIFY (F17) request in the same dialog. The NOTIFY (F17) body may be used to report state on the resource being monitored and indicate to the recipient that the sender is aware of an existing "haft-dialog" with the recipient. It may be formatted into the body format specified in the "Accept" header of the corresponding SUBSCRIBE (F11) request (dialog-info+xml). This body may contain the state of the subscribed "half-dialog". For example:

```
F17 NOTIFY Alice -> Proxy 1
NOTIFY sip:bob@client.biloxy.com SIP/2.0
To: Bob <sip:bob@biloxy.com>;tag=8672349
From: <sip:alice@atlanta.com>;tag=1234567
Call-ID: xt4653gs2ham@biloxi.com
Contact: <sip:alice@client.atlanta.com>
Event: dialog
Subscription-State: terminated;reason=timeout
Content-Type: application/dialog-info+xml
Content-Length: ...
    <?xml version="1.0"?>
        <dialog-info xmlns="urn:ietf:params:xml:ns:dialog-info"
        version="0" state="full" entity="sip:alice@atlanta.com">
            <dialog    id="as7d900as8"    call
            id="3848276298220188511@atlanta.com"
            local-tag="9fxced76sl" direction="initiator">
                <state>Proceeding</state>
            </dialog>
        </dialog-info>
```

It may be appreciated that the NOTIFY messages triggered by SUBSCRIBE messages with "Expires" headers of 0 will contain a "Subscription-State" value of "terminated", and a "reason" parameter of "timeout".

Figure 5:
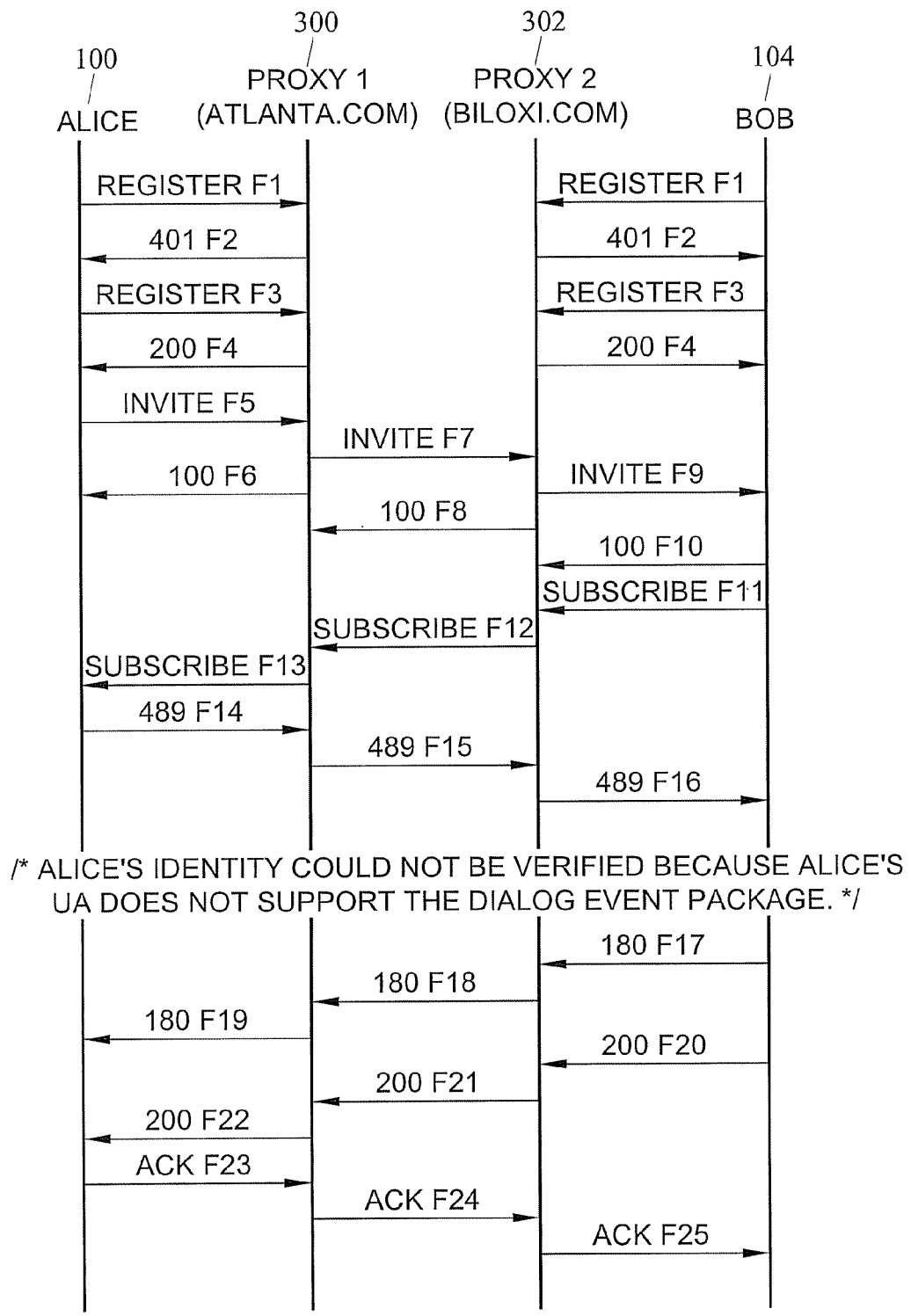
FIG. 5 is a message sequence diagram showing an exemplary unverified caii scenario for verifying the identity of a SIP user seeking to establish a session according to an embodiment of the subject matter described herein.

FIG. 5 is a message sequence diagram showing an exemplary unverified call scenario for verifying the identity of a SIP user seeking to establish a session according to an embodiment of the subject matter described herein. In the example call flow shown in FIG. 5, Alice 100 may complete a call to Bob 104 using two proxies (e.g., Proxy 1 300 and Proxy 2 302) from different service providers. In order to verify Alice's identity, Bob's UA 104 subscribes to the status of Alice's dialog but Alice's UA 100 does not support the Dialog event package. Hence, Alice 100 may issue a 489 Bad Event response to indicate that she did not understand the dialog event package. Alice's identity could not be verified and this information may be displayed to Bob 104. In the embodiment shown in FIG. 5, Bob 104 may decide to proceed with the unverified call.

Figure 6:
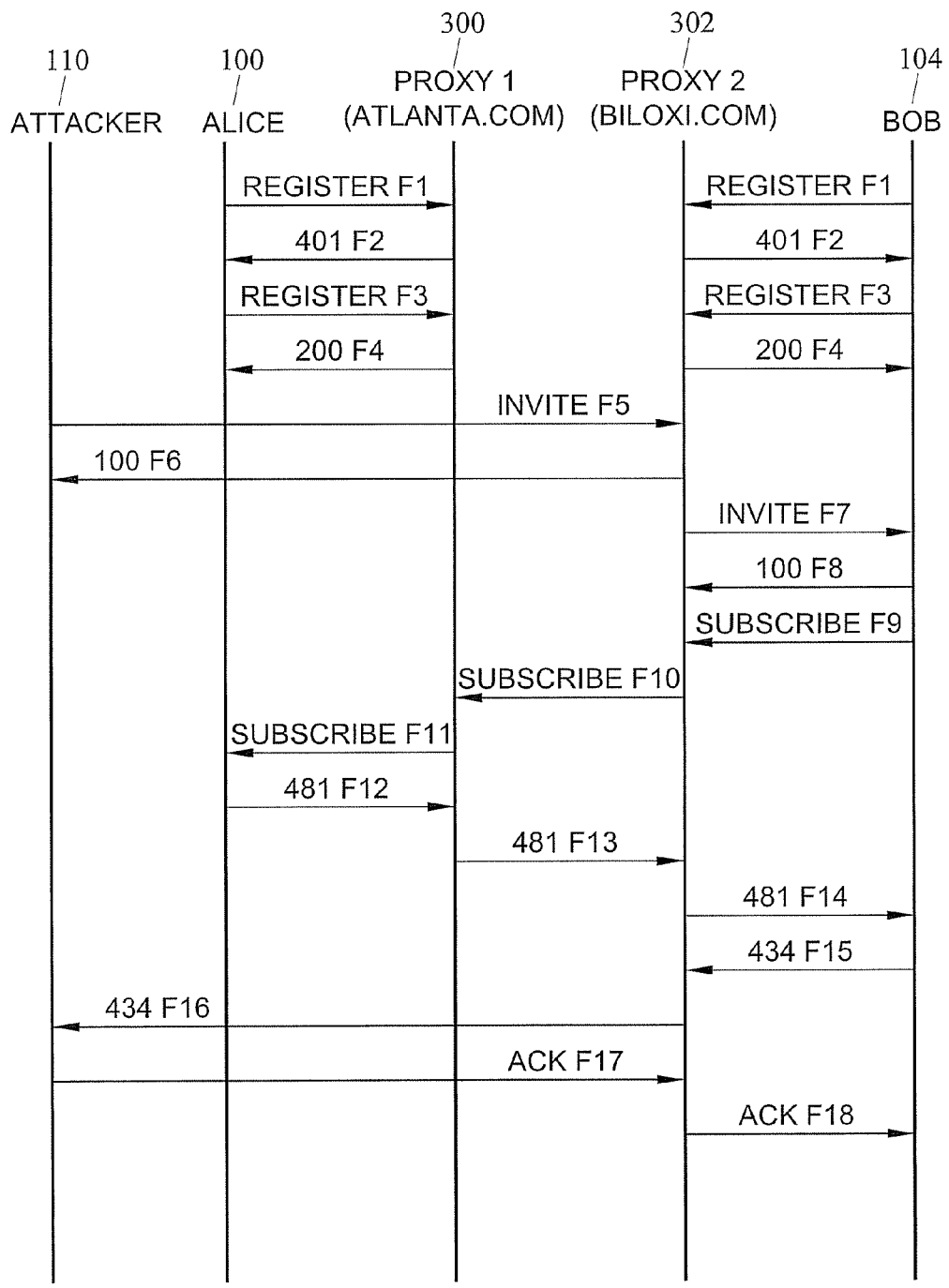
FIG. 6 is a message sequence diagram showing an exemplary suspicious call scenario for verifying the identity of a SIP user seeking to establish a session according to an embodiment of the subject matter described herein.

FIG. 6 is a message sequence diagram showing an exemplary suspicious call scenario for verifying the identity of a SIP user seeking to establish a session according to an embodiment of the subject matter described herein. In the example call flow shown in FIG. 6, Attacker 110 may issue an INVITE-request using a forged From URI, impersonating Alice's AOR (alice@atlanta.com). For example:

```
F5 INVITE Attacker -> Proxy 2
INVITE sip:bob@biloxi.com SIP/2.0
From: Alice <sip:alice@atlanta.com>;tag=9fxced76sl
To: Bob <sip:bob@biloxi.com>
Call-ID: 3848276298220188511@atlanta.com
Contact: <sip:attacker@pc1.attacker.com>
Content-Type: application/sdp
Content-Length: ...
```

In order to verify Alice's identity, Bob's UA 104 may subscribe to the status of Alice's dialog. Alice's UA 100 may issue a 481 Call/Transaction Does Not Exist response to indicate that she is not aware of the requested dialog. The caller's identity may be identified to be suspicious and this information may be displayed to Bob 104. In this example, Bob 104 decides to reject the call and a 434 Suspicious Call response may be sent.

Figure 7:
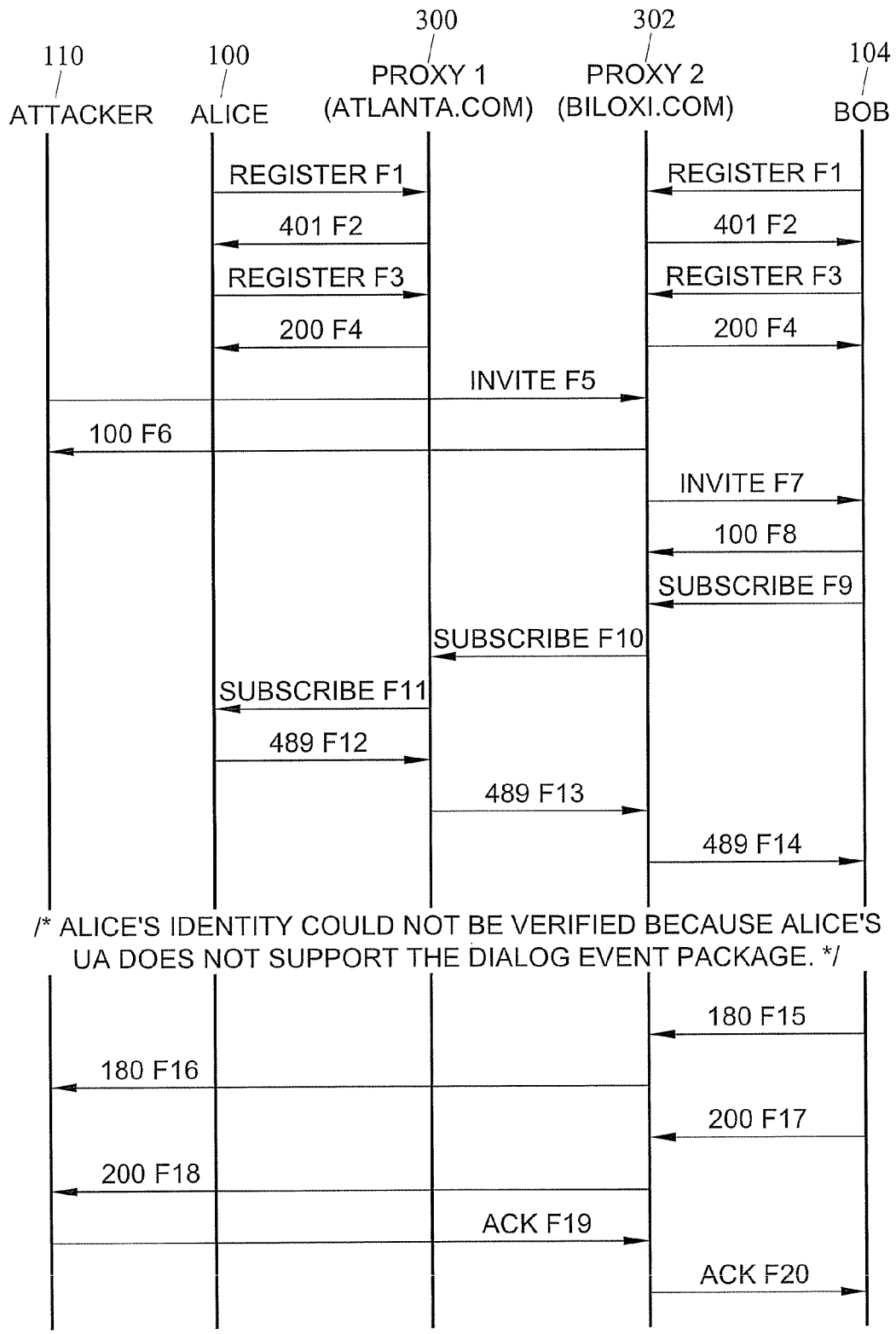
FIG. 7 is a message sequence diagram showing an exemplary unverified call scenario for verifying the identity of a SIP user seeking to establish a session according to an embodiment of the subject matter described herein.

FIG. 7 is a message sequence diagram showing an exemplary unverified call scenario for verifying the identity of a SIP user seeking to establish a session according to an embodiment of the subject matter described herein. In the example call flow shown in FIG. 7, Attacker 110 issues an INVITE request using a forged From URI, impersonating Alice 100. In order to verify Alice's identity, Bob's UA 104 subscribes to the status of Alice's dialog but Alice's UA 100 does not support the Dialog event package. Hence, Alice 100 issues a 489 Bad Event response to indicate that she did not understand the dialog event package. Alice's identity could not be verified and this information is displayed to Bob 104. In the example shown, Bob 104 may decide to proceed with the unverified call.

Figure 8A:
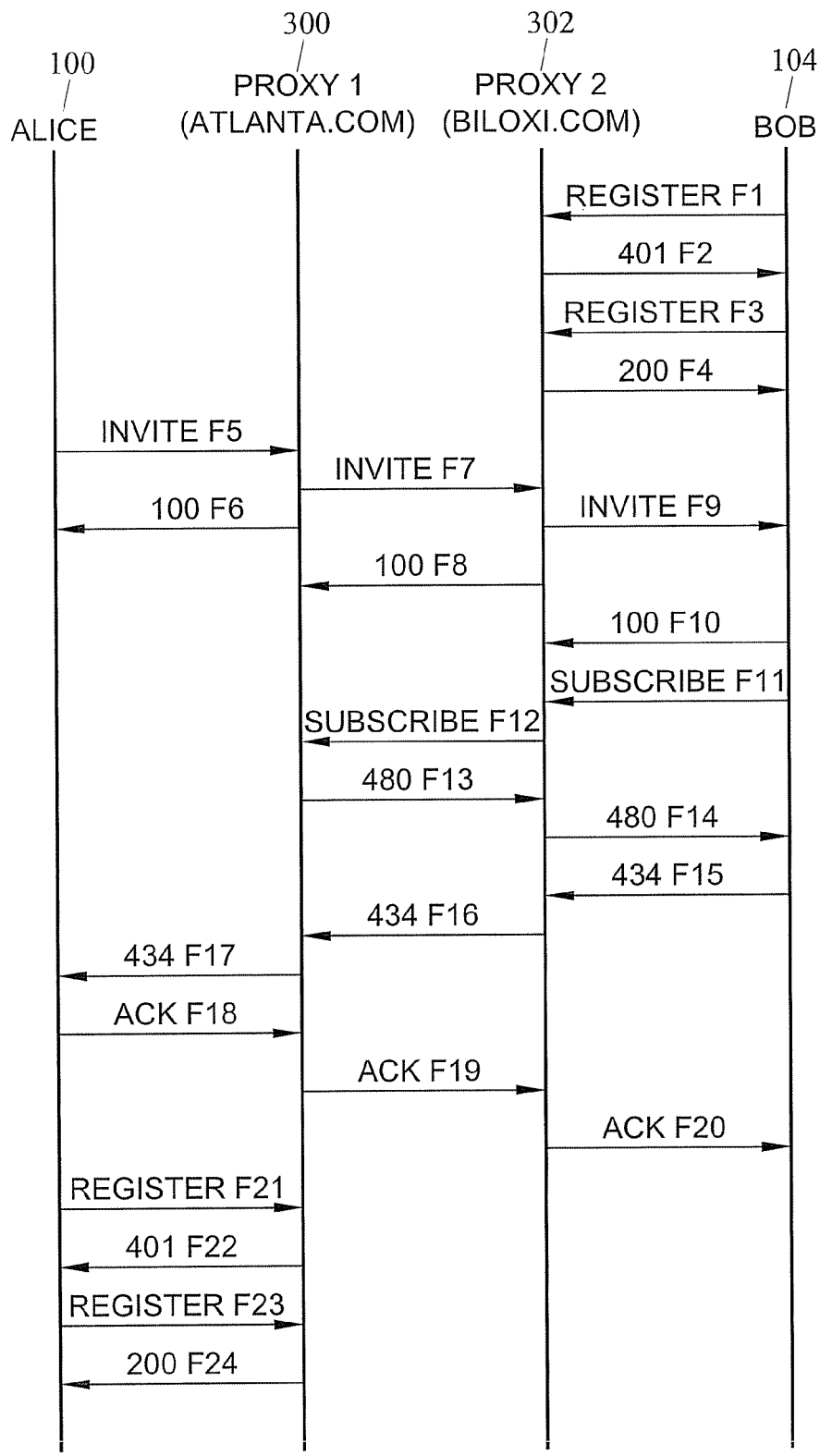
FIGS. 8A and 8B are a message sequence diagram showing an exemplary verified call scenario for verifying the identity of a SIP user seeking to establish a session according to an embodiment of the subject matter described herein.
Figure 8B:
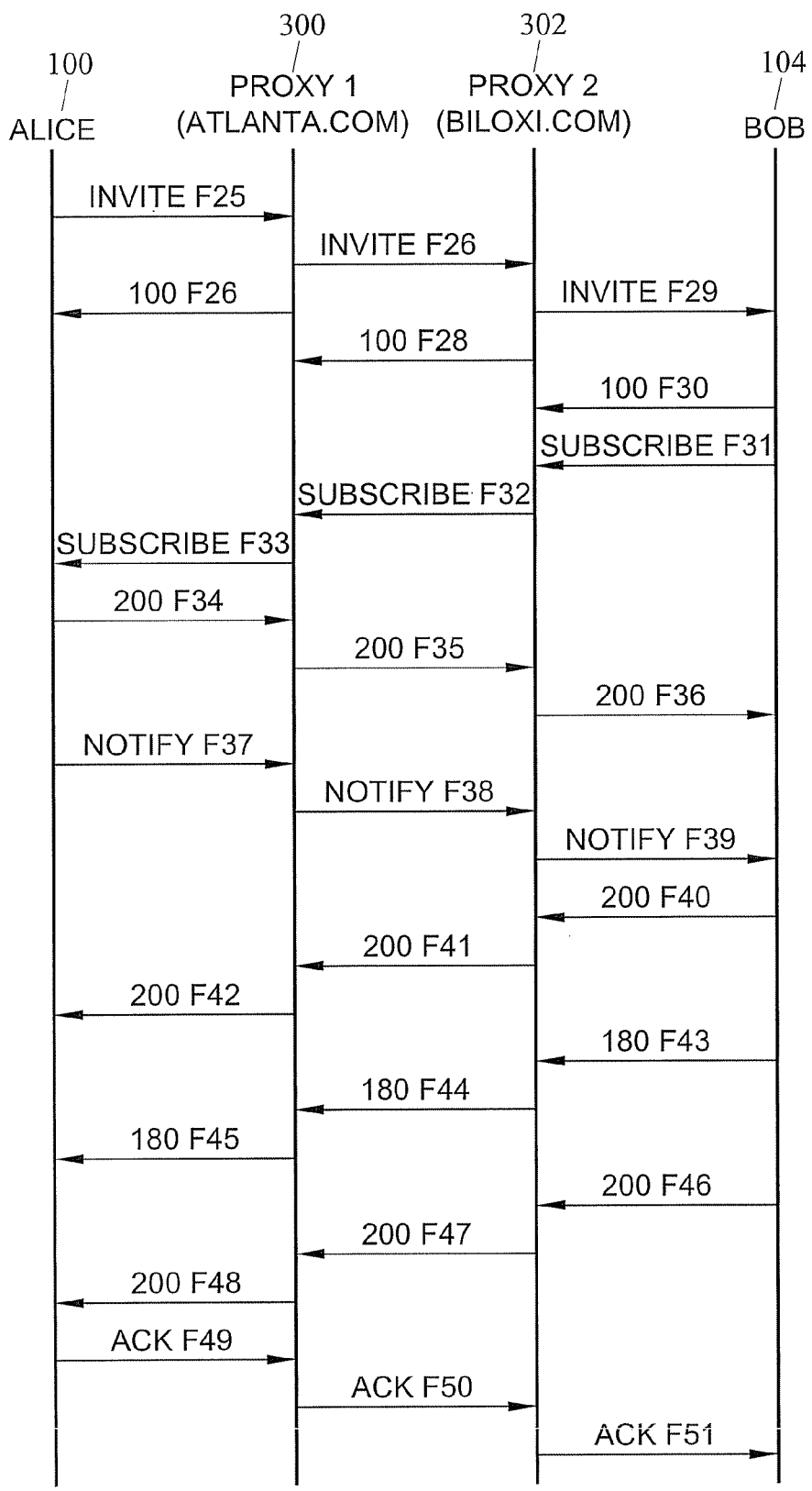

FIGS. 8A and 8B are a message sequence diagram showing an exemplary verified call scenario for verifying the identity of a SIP user seeking to establish a session according to an embodiment of the subject matter described herein. In the example call flow shown in FIG. 8, Alice 100 may complete a call to Bob 104 using two proxies (Proxy 1 and Proxy 2) from different service providers. In order to verify Alice's identity, Bob's UA 104 may subscribe to the status of Alice's dialog but since Alice 100 is not registered, her 100 home proxy does not currently have a valid forwarding location for her (F13). Then, Bob 100 may decide to reject the call and a 434 Suspicious Call may be sent. After receiving a 434 response, Alice's UA 100 may decide to register and authenticate with her service provider. Once she 100 is registered, the original INVITE-request may be re-sent. Alice's AOR can now be verified and the call may be successfully established.

Figure 9A:
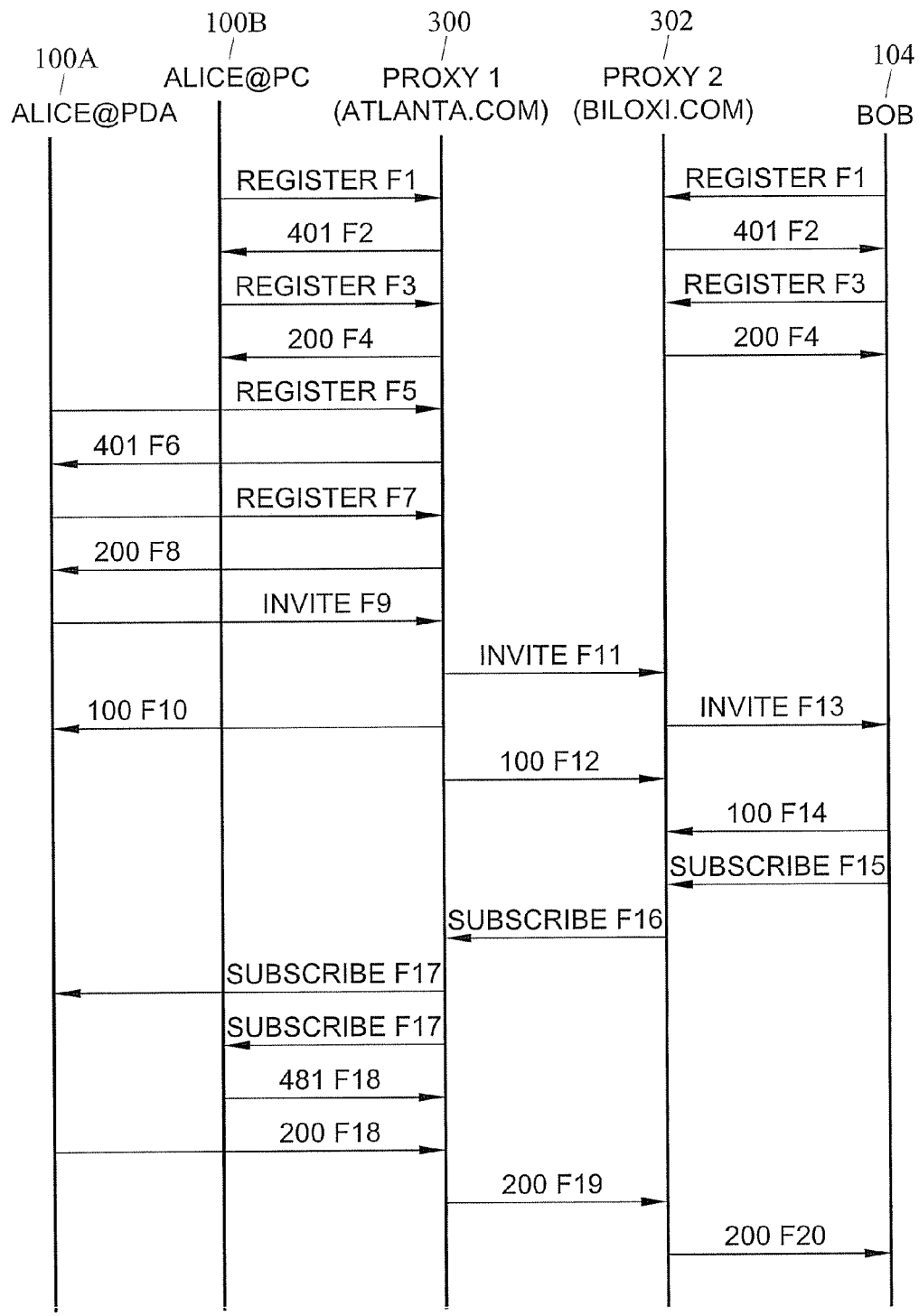
FIGS. 9A and 9B are a message sequence diagram showing an exemplary verified call scenario for verifying the identity of a SIP user seeking to establish a session according to an embodiment of the subject matter described herein.
Figure 9B:
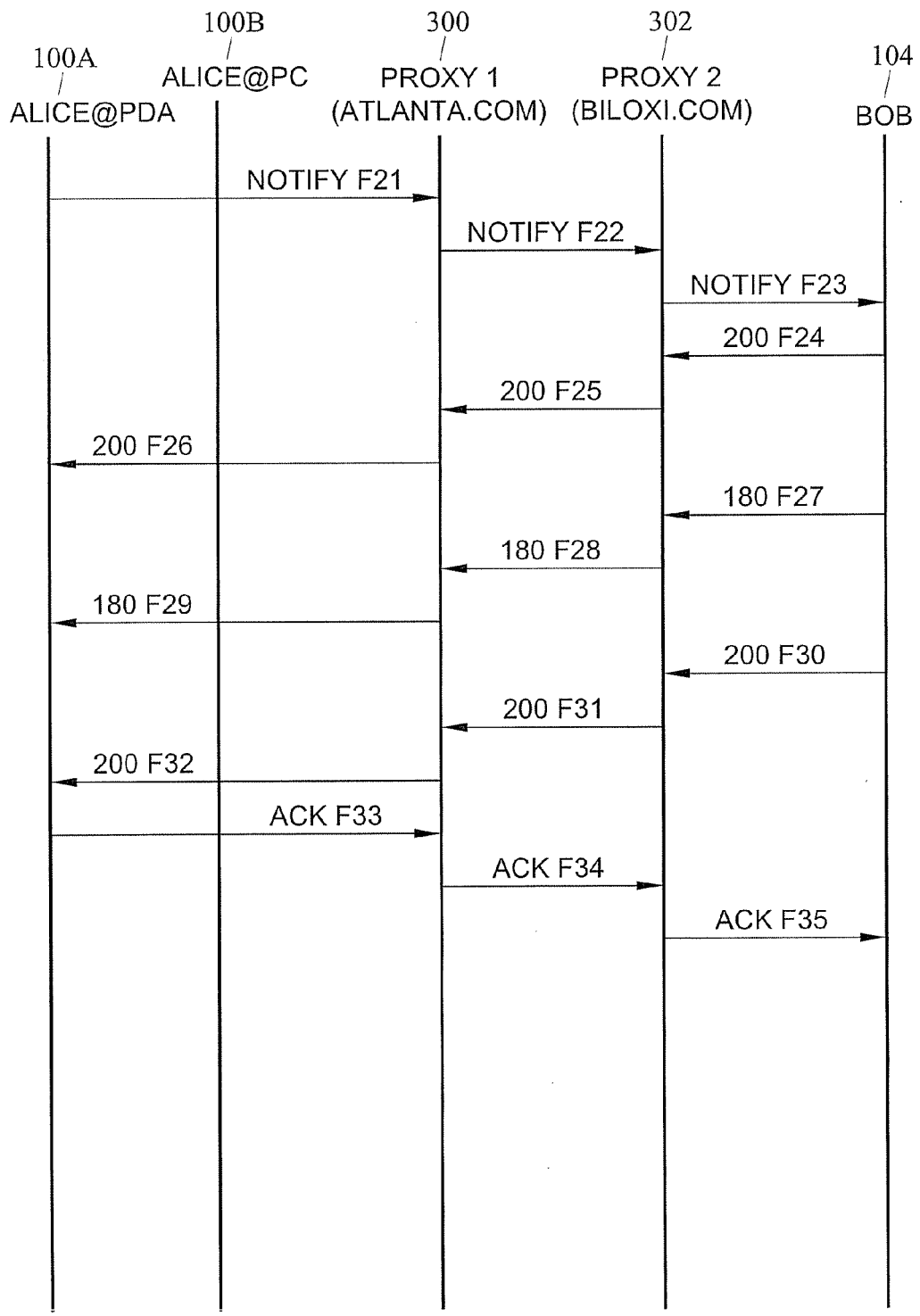

FIGS. 9A and 9B are a message sequence diagram showing an exemplary verified call scenario for verifying the identity of a SIP user seeking to establish a session according to an embodiment of the subject matter described herein. In the example call flow shown in FIG. 9, Alice 100 may complete a call to Bob 104 using two proxies (Proxy 1 and Proxy 2) from different service providers. In order to verify Alice's identity, Bob's UA 104 may subscribe to the status of Alice's dialog. Since Alice 100 is registered from multiple locations, Proxy 1 300 (a stateful proxy) chooses to route the SUBSCRIBE to multiple destinations (forking). Note that since only one of Alice's devices is involved in the INVITE-initiated dialog, a forked SUBSCRIBE will only result in a single 2xx (F18) response. Once Alice's identity is verified the call may be established successfully.

Figure 10A:
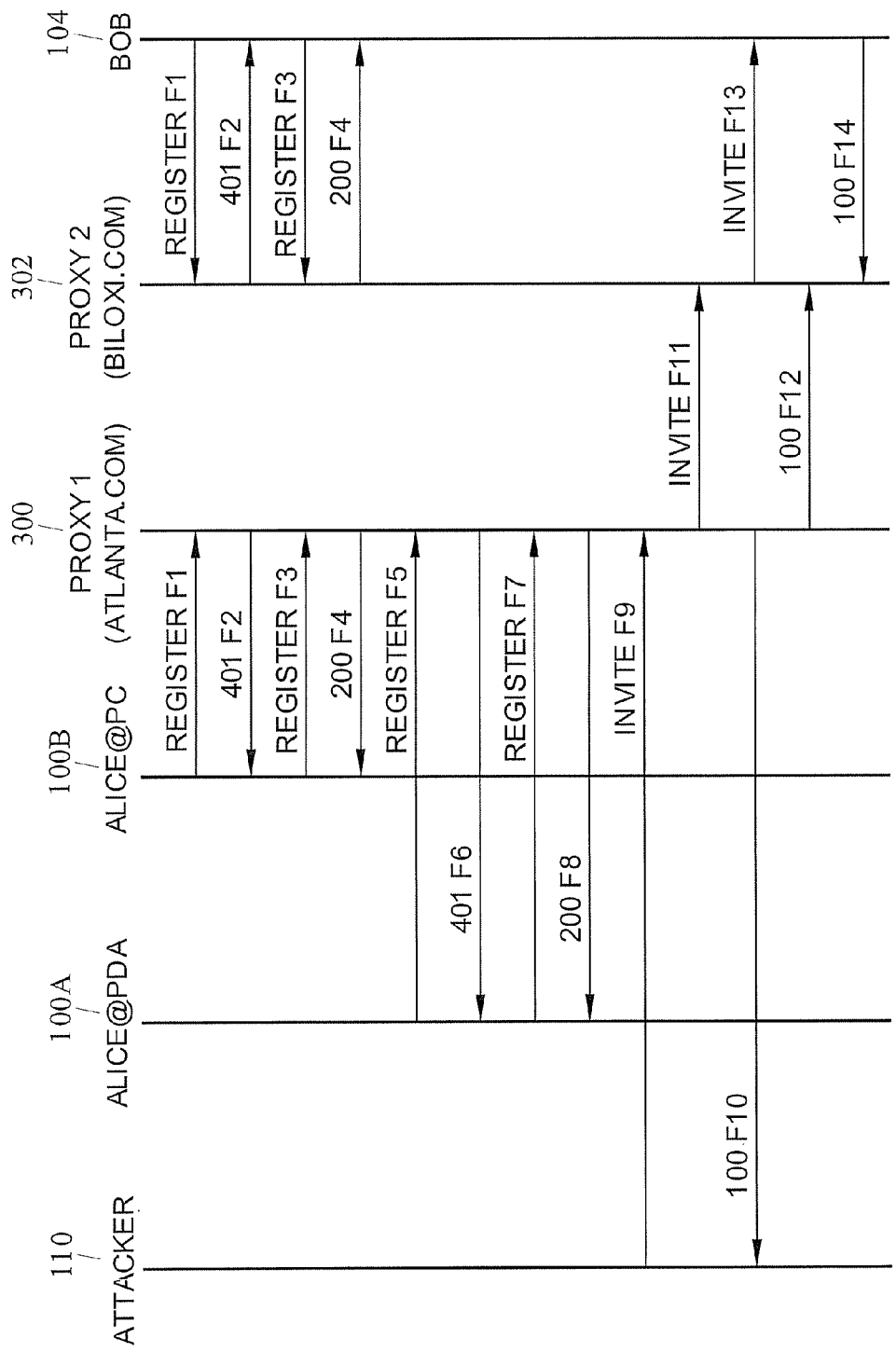
FIGS. 10A and 10B are a message sequence diagram showing an exemplary suspicious call scenario for verifying the identity of a SIP user seeking to establish a session according to an embodiment of the subject matter described herein.
Figure 10B:
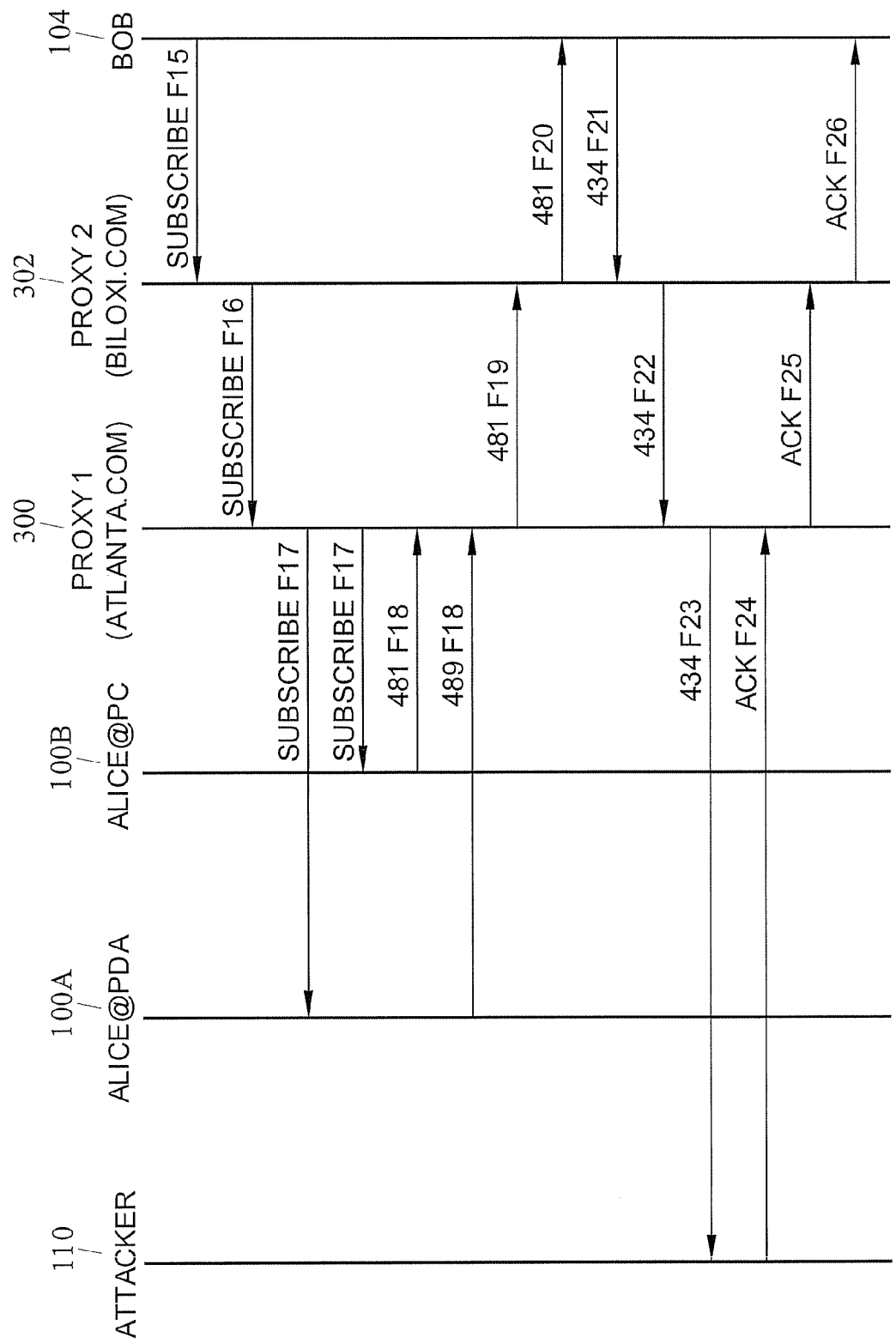

FIGS. 10A and 10B are a message sequence diagram showing an exemplary suspicious call scenario for verifying the identity of a SIP user seeking to establish a session according to an embodiment of the subject matter described herein. In the example call flow shown in FIG. 10, Attacker 110 may issue an INVITE request using a forged From URI, impersonating Alice 100. In order to verify Alice's identity, Bob's UA 104 may subscribe to the status of Alice's dialog. Since Alice 100 is registered from multiple locations, Proxy 1 300 (a stateful proxy) chooses to route the SUBSCRIBE to multiple destinations (forking). While Alice's UA on her PDA 100A does not support the Dialog event package, Alice's UA on her PC 100B does support it and issues a 481 Call/Transaction Does Not Exist response to indicate that it is not aware of the requested dialog. In this case, Proxy 1 300 may choose one of the responses among those received and stored in the response context, where preference may be given to 481 Responses. The caller's identity may be identified to be suspicious and this information may be displayed to Bob 104. In this example, Bob 104 may decide to reject the call and a 434 Suspicious Call indication may be sent.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for verifying the identity of a SIP user seeking to establish a session:
   at a computing platform that includes a SIP user agent:
   receiving an INVITE message for establishing a session, the INVITE message including sender identification information and dialog identification information;
   in response to receiving the INVITE message, sending a subscription request including the dialog identification information to a second computing platform that includes a user agent identified by the sender identification information in the INVITE message;
   receiving a response to the subscription request; and
   determining, based on the response to the subscription request, whether the identity of the sender of the INVITE message can be verified,
   wherein sending the subscription request message regarding the dialog ID includes sending a SUBSCRIBE message specifying an event identifying a half-dialog being subscribed to and wherein receiving a response includes receiving a response indicating awareness or non-awareness of the half-dialog.

2. The method of claim 1 comprising, in response to determining that the identity of the sender of the INVITE message cannot be verified, rejecting establishment of the session.

3. The method of claim 2 wherein rejecting the establishment of the session includes sending a suspicious call indication to the sender of the INVITE message.

4. The method of claim 1 comprising, in response to determining that the identity of the sender of the INVITE message cannot be verified, establishing the session with the sender of the INVITE message.

5. The method of claim 1 wherein determining based on the response whether the identity of the sender of the INVITE message can be verified includes determining that the identity can be verified in response to receiving a response message indicating awareness of the half-dialog.

6. A system for SIP identity verification, the system comprising:
   a computing platform;
   a session initiation module implemented on the computing platform for receiving an INVITE message for establishing a session, the INVITE message including a sender identification information and dialog identification information;
   a dialog event package module implemented on the computing platform for supporting a SIP dialog event package; and
   an identity verification module implemented on the computing platform for, in response to receiving the INVITE message, instructing the dialog event package module to send a subscription request including the dialog identification information to a second computing platform including a user agent identified by the sender identification information, for receiving a response to the subscription request, and for determining, based on the response, whether the identity of the sender of the INVITE message can be verified, wherein the identity verification module is configured to send a SUBSCRIBE message specifying an event identifying a half-dialog being subscribed to and wherein receiving a response includes receiving a response indicating awareness or non-awareness of the half-dialog.

7. The system of claim 6 wherein the identity verification module is configured to reject establishment of the session in response to determining that the identity of the sender of the INVITE message cannot be verified.

8. The system of claim 6 wherein the identity verification module is configured to send a suspicious call indication to the sender of the INVITE message.

9. The system of claim 6 wherein the identity verification module is configured to establish the session with the sender of the INVITE message in response to determining that the identity of the sender of the INVITE message cannot be verified.

10. The system of claim 6 wherein the identity verification module is configured to determine that the identity can be verified in response to receiving a response message indicating awareness of the half-dialog.

11. A computer readable medium comprising computer executable instructions embodied in a non-transitory computer readable medium and when executed by a processor of a computer performs steps comprising:

at a computing platform that includes a SIP user agent:
receiving an INVITE message for establishing a session, the INVITE message including sender identification information and dialog identification information;
in response to receiving the INVITE message, sending a subscription request including the dialog identification information to a second computing platform that includes a user agent identified by the sender identification information in the INVITE message;
receiving a response to the subscription request; and
determining, based on the response to the subscription request, whether the identity of the sender of the INVITE message can be verified,
wherein sending the subscription request message regarding the dialog ID includes sending a SUBSCRIBE message specifying an event identifying a half-dialog being subscribed to and wherein receiving a response includes receiving a response indicating awareness or non-awareness of the half-dialog.

* * * * *